United States Patent
Fujino et al.

(10) Patent No.: US 9,671,659 B2
(45) Date of Patent: Jun. 6, 2017

(54) LIQUID CRYSTAL DISPLAY

(71) Applicant: Mitsubishi Electric Corporation, Tokyo (JP)

(72) Inventors: Toshiaki Fujino, Tokyo (JP); Yasunori Niwano, Tokyo (JP); Akimasa Yuuki, Tokyo (JP); Tsuyoshi Tsuchiya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 14/559,154

(22) Filed: Dec. 3, 2014

(65) Prior Publication Data

US 2015/0160465 A1 Jun. 11, 2015

(30) Foreign Application Priority Data

Dec. 9, 2013 (JP) .................................. 2013-254190

(51) Int. Cl.
*G02F 1/1347* (2006.01)
*G02B 27/26* (2006.01)

(52) U.S. Cl.
CPC ........... *G02F 1/1347* (2013.01); *G02B 27/26* (2013.01)

(58) Field of Classification Search
CPC ............... G02F 1/13471; G02F 1/1347; G02F 2001/133531
See application file for complete search history.

(56) References Cited

U.S. PATENT DOCUMENTS

| | | | | |
|---|---|---|---|---|
| 7,688,411 B2 * | 3/2010 | Kim | ................... | G02F 1/134363 349/121 |
| 2008/0094545 A1 * | 4/2008 | Ko | .......................... | G02B 27/26 349/96 |
| 2012/0062527 A1 * | 3/2012 | Cheong | ................... | G02F 1/1347 345/204 |

FOREIGN PATENT DOCUMENTS

| | | |
|---|---|---|
| JP | S62-150329 A | 7/1987 |
| JP | 2857429 B2 | 2/1999 |

OTHER PUBLICATIONS

J. Stohr et al., Liquid crystal alignment by rubbed polymer surfaces: a microscopic bond orientation model; Journal of Electron Spectroscopy and Related Phenomena, 1999, p. 189-207; v98-99, Elsevier, San Jose, USA.

* cited by examiner

*Primary Examiner* — Nathanael R Briggs
(74) *Attorney, Agent, or Firm* — Studebaker & Brackett PC (57) ABSTRACT

A display panel has a first viewing-angle characteristic for a first yellow-shift direction that is an oblique visual-field direction in which an image shifts to yellow in white display and for a first blue-shift direction that is a visual field direction in which an image shifts to blue in white display. A parallax barrier panel has a second viewing-angle characteristic for a second yellow-shift direction that is an oblique visual-field direction in which an image shifts to yellow in white display and for a second blue-shift direction that is a visual field direction in which an image shifts to blue in white display. The display panel and the parallax barrier panel are laminated such that the first yellow-shift direction and the second blue-shift direction agree with each other and that the first blue-shift direction and the second yellow-shift direction agree with each other.

5 Claims, 5 Drawing Sheets

LIQUID CRYSTAL DISPLAY

BACKGROUND OF THE INVENTION

Field of the Invention

The present invention relates to a liquid crystal display, such as an auto-stereoscopic display employing the liquid-crystal parallax-barrier system, that has a laminated structure of two liquid crystal panels.

Description of the Background Art

In recent years, as a liquid crystal display having a laminated structure of two liquid crystal panels, an auto-stereoscopic image display that allows for a stereoscopic vision without the need for special glasses has been proposed. For example, Japanese Patent No. 2857429 discloses a three-dimensional image display including a barrier generation means and an image display means. The barrier generation means generates parallax barrier stripes by electronically controlling transmissive display elements. The image display means includes a display screen disposed at a predetermined distance backward from the position at which the parallax barrier stripes are generated. In displaying a three-dimensional image, the image display means is capable of outputting and displaying, on the above-mentioned display screen, a multidirectional image including stripes of a left image and a right image alternately aligned therein corresponding to the parallax barrier stripes.

Such a three-dimensional image display is characterized as follows. The display is configured such that parallax barrier stripes are electronically generated and the form (the number and width of the stripes and the stripe interval), the position (phase), the density, and the like of the generated parallax barrier strips are variably-controlled as desired. Thus, the display can be used as a two-dimensional image display and a method for displaying a two-dimensional image and the display can be also used as a three-dimensional display and a method for displaying a three-dimensional image. Therefore, a compatible image display and a compatible image displaying method can be provided.

The liquid crystal display such as the three-dimensional image display described above, which is formed of two liquid crystal panels, includes a lamination of a parallax-barrier liquid crystal panel and an image-display liquid crystal panel. Unfortunately, the liquid crystal panel has a viewing-angle characteristic in which an image changes in color when the liquid crystal panel is viewed at an angle oblique to the display screen. Thus, in the liquid crystal display including the lamination of the liquid crystal panels, the display quality is degraded due to an increase in color shift in the oblique visual field.

SUMMARY OF THE INVENTION

The present invention has an object to provide a liquid crystal display including two liquid crystal panels that is capable of displaying a high-display-quality image.

A liquid crystal display according to the present invention is a liquid crystal display including a laminated structure of a first liquid crystal panel and a second liquid crystal panel, wherein an upper part or a lower part of the laminated structure is defined as a display surface.

The first liquid crystal panel includes a first liquid crystal layer, a first upper substrate and a first lower substrate sandwiching the first liquid crystal layer, a first upper polarizing plate located over the first upper substrate, and a first lower polarizing plate located under the first lower substrate.

The second liquid crystal panel includes a second liquid crystal layer, a second upper substrate and a second lower substrate sandwiching the second liquid crystal layer, a second upper polarizing plate located over the second upper substrate, and a second lower polarizing plate located under the second lower substrate.

The first liquid crystal panel has a first viewing-angle characteristic for a first yellow-shift direction that is a visual field direction in which an image shifts to yellow in white display and for a first blue-shift direction that is a visual field direction in which an image shifts to blue in white display.

The second liquid crystal panel has a second viewing-angle characteristic for a second yellow-shift direction that is a visual field direction in which an image shifts to yellow in white display and for a second blue-shift direction that is a visual field direction in which an image shifts to blue in white display.

The first and second liquid crystal panels are laminated such that the first yellow-shift direction and the second blue-shift direction agree with each other and that the first blue-shift direction and the second yellow-shift direction agree with each other.

The liquid crystal display according to the present invention can effectively suppress the color shift in white display as viewed from the visual field directions oblique to the display surface, to thereby display a high-display-quality image.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment (Overall Structure)

Figure 1:
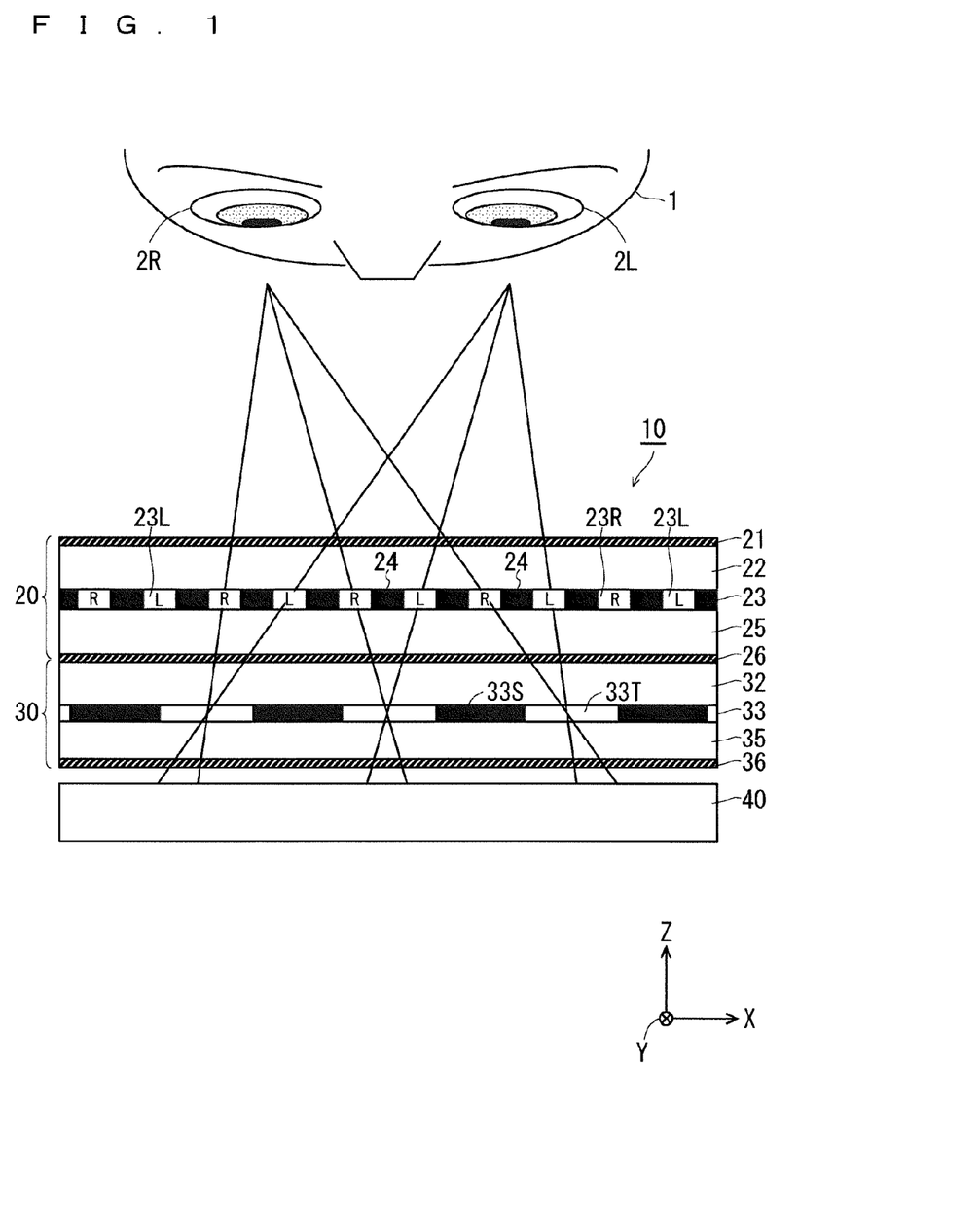
FIG. 1 is a cross-sectional view showing a cross-sectional structure of a liquid crystal display according to a first preferred embodiment of the present invention.

FIG. 1 is a cross-sectional view showing a cross-sectional structure of a liquid crystal display (an auto-stereoscopic image display employing the liquid-crystal parallax-barrier system) 10 that has a laminated structure of two liquid crystal panels according to a first preferred embodiment of the present invention. Note that coordinate axes X, Y, and Z are shown in FIG. 1 and in each of FIGS. 2 to 5 described below.

The liquid crystal display 10 is capable of simultaneously displaying two images (three-dimensional image) formed of a right image (a parallax image for the right eye (first observation-direction image; first-type image)) and a left image (a parallax image for the left eye that is slightly different from the parallax image for the right eye (second observation-direction image; second-type image)).

The liquid crystal display 10 allows for the visual recognition of a stereoscopic image by the naked eye without the need for special glasses. The liquid crystal display 10 can also display different images in different observation directions. The following description is mainly given to the case where the liquid crystal display 10 displays parallax images for the right eye and the left eye. For the convenience of description, the up-down direction (Z direction) shown in FIG. 1 is hereinafter referred to as the front-rear direction, the right-left direction (X direction) shown in FIG. 1 is hereinafter referred to as the crosswise direction (horizontal direction), and the depth direction (Y direction) shown in FIG. 1 is hereinafter referred to as the lengthwise direction (vertical direction).

As shown in FIG. 1, the liquid crystal display 10 includes a (liquid crystal image) display panel 20 (first liquid crystal panel) and a parallax barrier panel 30 (second liquid crystal display panel) disposed behind (under) the display panel 20. As shown in FIG. 1, a backlight 40 is disposed on the rear of (−Z direction) the parallax barrier panel 30. Thus, the surfaces of the display panel 20 and the parallax barrier panel 30 in the front (+Z direction) respectively confronting a viewer 1 are defined as the display surfaces.

The display panel 20 is a matrix liquid-crystal image display panel that displays an image using a matrix of a plurality of pixels. The display panel 20 includes, as main constituents, a liquid crystal layer 23 (first liquid crystal layer) in which liquid crystals are formed, transparent substrates 22 and 25 (first upper and lower substrates) opposed to each other with the liquid crystal layer 23 therebetween, an upper-side polarizing plate 21 (first upper polarizing plate) disposed on the transparent substrate 22 on the opposite side to the liquid crystal layer 23, and an intermediate polarizing plate 26 (first lower polarizing plate (second upper polarizing plate)) disposed on the transparent substrate 25 on the opposite side to the liquid crystal layer 23. Note that electrodes for driving the liquid crystals (molecules) in the liquid crystal layer 23 of the display panel 20 are omitted from FIG. 1.

In the liquid crystal layer 23 of the display panel 20, right-eye sub-pixel regions 23R (first-type-image regions) that display an image for an right eye 2R of the viewer 1 and left-eye sub-pixel regions 23L (second-type-image regions) that display an image for an left eye 2L of the viewer 1 are alternately disposed in the crosswise direction (horizontal direction, X direction) while each of the regions is sandwiched between light shielding portions 24.

The right-eye sub-pixel region 23R and the left-eye sub-pixel region 23L are formed to have the same or substantially the same breadth. The right-eye sub-pixel regions 23R and the left-eye sub-pixel regions 23L configured as described above are aligned at a predetermined uniform pitch in the crosswise direction (X direction) in the display panel 20. In the first preferred embodiment, the right-eye sub-pixel regions 23R and the left-eye sub-pixel regions 23L are aligned not only in the crosswise direction but also in the lengthwise direction (Y direction).

The parallax barrier panel 30 includes two transparent substrates 32 and 35 (second upper and lower substrates), a liquid crystal layer 33 (second liquid crystal layer) that is sandwiched and held between the transparent substrates 32 and 35, and a lower-side polarizing plate 36 (second lower polarizing plate) disposed on the transparent substrate 35 on the opposite side to the liquid crystal layer 33. The intermediate polarizing plate 26, which is the polarizing plate disposed between the parallax barrier panel 30 and the display panel 20, is used in common as the first lower polarizing plate for the display panel 20 and the second upper polarizing plate for the parallax barrier panel 30. Note that, for example, electrodes for driving the liquid crystals in the liquid crystal layer 33 of the parallax barrier panel 30 are omitted from FIG. 1 for the convenience of description.

A plurality of striped transparent electrodes that extend in the lengthwise direction (the depth direction (Y direction) in FIG. 1) are formed on the surface of one of the transparent substrates 32 and 35 of the parallax barrier panel 30 on the liquid-crystal-layer-33 side. A (solid) counter transparent electrode is formed on the entire surface of the other transparent substrate on the liquid-crystal-layer-33 side. An electric field is applied onto the liquid crystal layer 33 by, for example, the transparent electrodes formed on the transparent substrates 32 and 35, whereby the liquid crystal molecules in the liquid crystal layer 33 are driven.

(Parallax Barrier Panel 30)

In the first preferred embodiment, the twisted nematic (TN) mode is employed as the liquid crystal mode for driving the liquid crystal molecules in the liquid crystal layer 33 of the parallax barrier panel 30. When a voltage is selectively applied between the striped transparent electrodes and the counter transparent electrode described above, only the region having the voltage applied thereto is shielded from light, thereby forming parallax barrier stripes (a partial light-shielding state in which a shielding region 33S and a transmissive region 33T exist alongside each other) that are necessary for displaying two images (three-dimensional image (second-form image)). When no voltage is applied onto all of the striped transparent electrodes and the counter transparent electrode, meanwhile, the entire surface of the parallax barrier panel 30 can be transformed into the transmissive state (complete light-transmissive state), thereby displaying a single image (two-dimensional image; first-form image).

Figure 2:
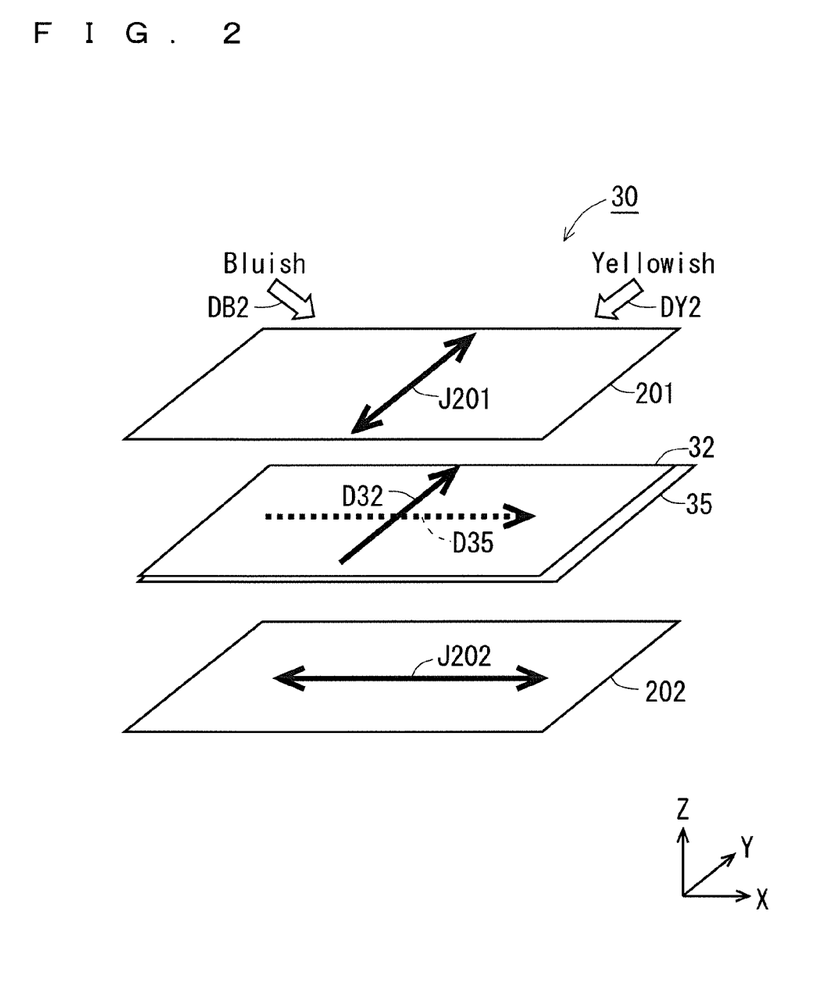
FIG. 2 is a view schematically describing polarizing-plate absorption axes and rubbing directions in a parallax barrier panel of the liquid crystal display according to the first preferred embodiment.

FIG. 2 is a view schematically describing polarizing-plate absorption axes and rubbing directions in the parallax barrier panel 30 of the liquid crystal display 10 according to the first preferred embodiment. The liquid crystal molecules in the liquid crystal layer 33 are aligned such that the major axes of the molecules extend in the rubbing direction (alignment direction). The setting of the rubbing direction is described below.

For example, an alignment film (now shown) is disposed on the opposed surface (lower surface) of the transparent substrate 32 on the liquid-crystal-layer-33 side so as to be in contact with the liquid crystal layer 33, and then, the alignment film is rubbed in the +Y direction. This allows, as shown in FIG. 2, a rubbing direction D32 in the liquid crystal layer 33 on the transparent-substrate-32 side to be set in the +Y direction.

Meanwhile, another alignment film (now shown) is disposed on the opposed surface (upper surface) of the transparent substrate 35 on the liquid-crystal-layer-33 side so as to be in contact with the liquid crystal layer 33, and then, the alignment film is rubbed in the +X direction. This allows, as shown in FIG. 2, a rubbing direction D35 in the liquid crystal layer 33 on the transparent-substrate-35 side to be set in the +X direction.

As shown in FIG. 2, an absorption axis J201 in an upper-side polarizing plate 201 disposed over the parallax barrier panel 30 is set to extend in the Y direction and an absorption axis J202 in a lower-side polarizing plate 202 disposed under the parallax barrier panel 30 is set to extend in the X direction.

The parallax barrier panel 30 in the TN mode, with the polarizing-plate absorption axes in the upper-side polarizing plate 201 and the lower-side polarizing plate 202 and the alignment orientations of liquid crystals in the liquid crystal layer 33 (the rubbing directions D32 and D35) as shown in FIG. 2, has the viewing angle characteristic (second viewing-angle characteristic) in which an image becomes yellowish in white display as viewed from the upper right and the lower left and an image becomes bluish in white display as viewed from the upper left and the lower right.

That is, the parallax barrier panel 30 has the viewing angle characteristic (second viewing-angle characteristic) for a yellow shift direction DY2 (second yellow-shift direction) that is the oblique visual-field direction (including the upper right and lower left directions) in which an image shifts to yellow in white display and for a blue shift direction DB2 (second blue-shift direction) that is the oblique visual-field direction (including the upper left and lower right directions) in which an image shifts to blue in white display.

Herein, "viewed from the upper right" means being viewed at a polar angle of 45° on the plane at an azimuth angle of 45° (the plane extending from the lower left to the upper right). The polar angle is an angle to the axis perpendicular to the display surface (the direction toward the right is (+) and the direction toward the left is (−)). In addition, "viewed from the lower left" means being viewed at a polar angle of −45° on the plane at an azimuth angle of 45°.

Similarly, "viewed from the upper left" means being viewed at a polar angle of −45° on the plane at an azimuth angle of 135° (the plane extending from the upper left to the lower right) and "viewed from the lower right" means being viewed at a polar angle of 45° on the plane at an azimuth angle of 135°.

Note that arrows indicating the blue shift direction DB2 and the yellow shift direction DY2 shown in FIG. 2 and arrows indicating a blue shift direction DB1 and yellow shift direction DY1 shown FIG. 3 described below are merely schematic and do not reflect the correct directions.

The viewing angle characteristic (second viewing-angle characteristic) of the parallax barrier panel 30 is described below. When the rubbing direction D32 and D35 in the liquid crystal layer 33 are set as shown in FIG. 2, the alignment state of the liquid crystal molecules in the liquid crystal layer 33 becomes substantially axisymmetric relative to the plane at the azimuth angle of 45°, so that the color shifting state as viewed from the upper right (upper left) and the color shifting state as viewed from the lower left (lower right) become substantially identical. At this time, the upper right and lower left directions become the yellow shift direction DY2 and the upper left and lower right directions become the blue shift direction DB2 because the transmittance spectrum differs depending on the liquid crystal alignment in the liquid crystal layer 33.

(Display Panel 20)

Meanwhile, in the liquid crystal display 10 according to the first preferred embodiment, the fringe field switching (FFS) mode is employed as the liquid crystal mode for driving the liquid crystal molecules in the liquid crystal layer 23 of the display panel 20. The FFS mode is the driving mode in which the light transmittance is controlled by rotations of liquid crystal molecules in a plane that occur due to a transverse electric field generated by a planar electrode and a slit electrode laminated on one of the transparent substrates 22 and 25.

Figure 3:
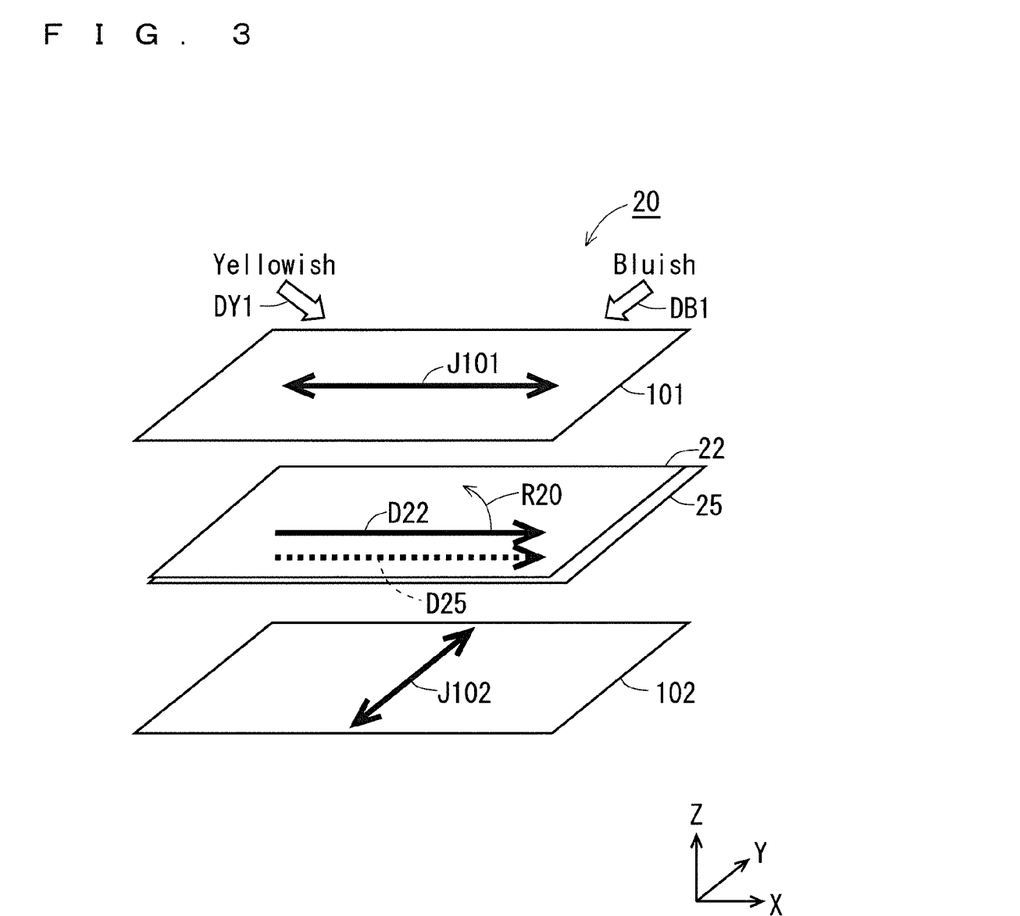
FIG. 3 is a view schematically describing polarizing-plate absorption axes, rubbing directions, and a rotation direction of liquid crystal molecules during driving in a display panel of the liquid crystal display according to the first preferred embodiment.

FIG. 3 is a view schematically drawing polarizing-plate absorption axes, rubbing directions, and a rotation direction of the liquid crystal molecules in the liquid crystal layer 23 during driving in the display panel 20 of the liquid crystal display 10 according to the first preferred embodiment.

For example, an alignment film (not shown) is disposed on the opposed surface (lower surface) of the transparent substrate 22 on the liquid-crysta-layer-23 side so as to be in contact with the liquid crystal layer 23, and then, the alignment film is rubbed in the +X direction, whereby a rubbing direction D22 in the liquid crystal layer 23 on the transparent-substrate-22 side can be set in the +X direction as shown in FIG. 3.

Similarly, another alignment film (not shown) is disposed on the opposed surface (upper surface) of the transparent substrate 25 on the liquid-crystal-layer-23 side so as to be in contact with the liquid crystal layer 23, and then, the alignment film is rubbed in the +X direction, whereby a rubbing direction D25 in the liquid crystal layer 23 on the transparent-substrate-25 side can be set in the +X direction as shown in FIG. 3.

As shown in FIG. 3, an absorption axis J101 in an upper-side polarizing plate 101 disposed over the display panel 20 is set to extend in the X direction and an absorption axis J102 in a lower-side polarizing plate 102 disposed under the display panel 20 is set to extend in the Y direction.

The rotation direction of the liquid crystal molecules in the liquid crystal layer 23 in the FFS mode is determined by the extending direction of the slit electrode described above.

In a case where the rubbing directions D22 and D25 are set as shown in FIG. 3, the extending direction of the slit electrode (now shown) is inclined at about 5 to 15° clockwise to the rubbing direction D22 (D25) such that a counterclockwise rotation direction R20 is provided.

The display panel 20 in the FFS mode, with the absorption axes J101 and J102 in the upper-side polarizing plate 101 and the lower-side polarizing plate 102, the alignment orientations of liquid crystals including the rubbing directions D22 and D25, and the rotation direction R20 of the liquid crystal molecules in the liquid crystal layer 23 as shown in FIG. 3, has the viewing angle characteristic (first viewing-angle characteristic) in which an image becomes bluish in white display as viewed from the upper right and the lower left and an image becomes yellowish in white display as viewed from the upper left and the lower right.

That is, the display panel 20 has the viewing angle characteristic (first viewing-angle characteristic) where the oblique visual-field direction in which an image shifts to yellow in white display becomes the yellow shift direction DY1 (first yellow-shift direction) and the oblique visual-field direction in which an image shifts to blue in white display becomes the blue shift direction DB1 (first blue-shift direction).

The viewing angle characteristic of the display panel 20 is described below. When the liquid crystal layer 23 is driven by applying a voltage between the planar electrode and the slit electrode of the display panel 20 in the FFS mode, an electric field in the direction perpendicular to the extending direction of the slit electrode is generated in the liquid crystal layer 23, so that the major axes of the liquid crystal molecules in the liquid crystal layer 23 rotate to approach the above-mentioned direction of the electric field (provided that the liquid crystals are commonly-used positive-type liquid crystals).

In a case where the alignment direction (rubbing direction) of the liquid crystal molecules in the liquid crystal layer 23 is parallel to the extending direction of the slit electrode, the liquid crystal molecules rotate clockwise and counterclockwise, each with a probability of 50%, as viewed from above. That is, the rotation direction of the liquid crystals is not constant, so that the color shift in the oblique visual field cannot be controlled.

By using the property that the liquid crystal molecules in the liquid crystal layer 23 rotate only in the direction in which the amount of rotation is smaller, the extending direction of the slit electrode is inclined at about 5 to 15° clockwise to the alignment direction of the liquid crystal molecules in the liquid crystal layer 23 such that the counterclockwise rotation direction R20 shown in FIG. 3 is provided.

Therefore, the color shift in the oblique visual field of the display panel 20 can be controlled, so that the display panel 20 having the first viewing-angle characteristic for the blue shift direction DB1 and the yellow shift direction DY1 described above can be provided.

Conversely, in a case where the extending direction of the slit electrode is inclined at about 5 to 15° counterclockwise to the rubbing direction, the liquid crystal molecules in the liquid crystal layer 23 during driving rotate clockwise, whereby the relation between the direction in which the display panel 20 is viewed and the color shift is inverted (the viewing angle characteristic (the characteristic same as the second viewing-angle characteristic described above) in which an image becomes yellowish as viewed from the upper right and the lower left and an image becomes bluish as viewed from the upper left and the lower right is provided).

(Laminated Structure of Display Panel 20 and Parallax Barrier Panel 30)

Figure 4:
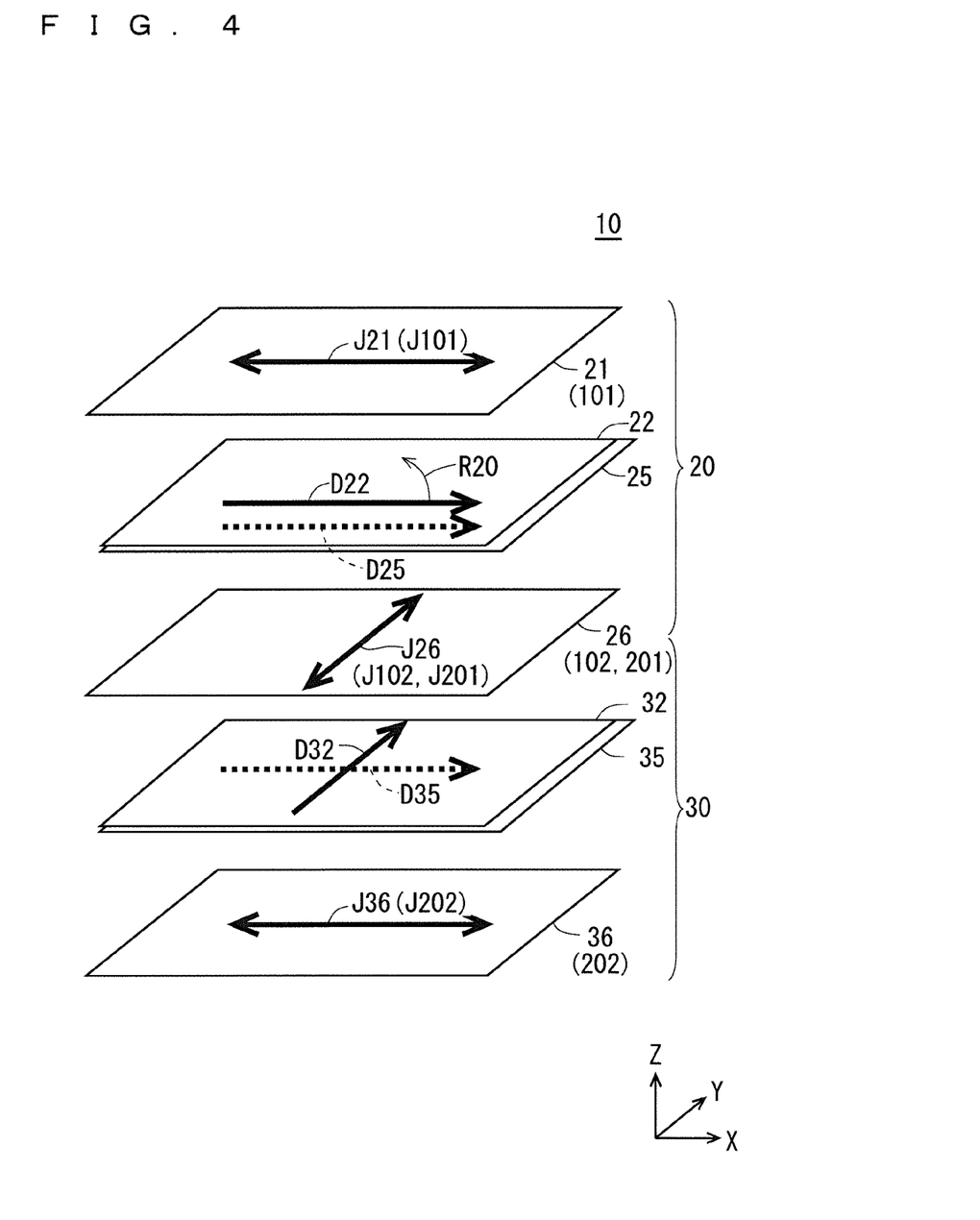
FIG. 4 is a view schematically describing a laminated structure and relations among optical axes in the liquid crystal display according to the first preferred embodiment.

FIG. 4 is a view schematically describing a laminated structure and relations among the optical axes in the liquid crystal display 10 according to the first preferred embodiment. In the structure shown in FIG. 4, the display panel 20 shown in FIG. 3 is laminated over the parallax barrier panel 30 shown in FIG. 2 with the intermediate polarizing plate 26 therebetween. The upper-side polarizing plate 21 is provided as the upper-side polarizing plate 101 of the display panel 20. The intermediate polarizing plate 26 functions as the dual-purpose polarizing plate for the lower-side polarizing plate 102 of the display panel 20 and the upper-side polarizing plate 201 of the parallax barrier panel 30. The lower-side polarizing plate 36 is provided as the lower-side polarizing plate 202 of the parallax barrier panel 30.

Thus, an absorption axis J21 in the upper-side polarizing plate 21 is set in the same direction as that of the absorption axis J101 in the upper-polarizing plate 101. An absorption axis J26 in the intermediate polarizing plate 26 is set in the same direction as that of the absorption axis J102 in the lower-side polarizing plate 102 and that of the absorption axis J201 in the upper-side polarizing plate 201. An absorption axis J36 in the lower-side polarizing plate 36 is set in the same direction as that of the absorption axis J202 in the lower-side polarizing plate 202.

The absorption axis J102 in the lower-side polarizing plate 102 and the absorption axis J201 in the upper-side polarizing plate 201 are set in the same direction (Y direction, see FIGS. 2 and 3). Therefore, the operation is not hindered even if the intermediate polarizing plate 26 doubles as the lower-side polarizing plate 102 and the upper-side polarizing plate 201.

In the liquid crystal display 10 having the structure shown in FIG. 4 according to the first preferred embodiment, the display panel 20 and the parallax barrier panel 30 are laminated such that the yellow shift direction DY2 (including the upper right and lower left directions) generated in white display of the parallax barrier panel 30 and the blue shift direction DB1 (including the upper right and lower left directions) generated in white display of the display panel 20 overlap to agree with each other. Similarly, the display panel 20 and the parallax barrier panel 30 are laminated such that the blue shift direction DB2 (including the upper left and lower right directions) generated in white display of the parallax barrier panel 30 and the yellow shift direction DY1 (including the upper left and lower right directions) generated in white display of the display panel 20 overlap to agree with each other.

Therefore, in each of the oblique visual-field directions including the upper right and lower left directions and the upper left and lower right directions, "yellow color" and "blue color" overlap each other to be canceled out, whereby "white color" is displayed. Thus, the viewing angle characteristics of generating the color shift in the oblique visual fields can be effectively suppressed in the liquid crystal display 10 overall.

In laminating the display panel 20 and the parallax barrier panel 30, the direction of the absorption axis J201 serving as the absorption axis in the upper-side polarizing plate of the parallax barrier panel 30 and the direction of the absorption axis J102 serving as the absorption axis in the lower-side polarizing plate of the display panel 20 are set to agree with each other such that the utilization efficiency of light is maximized. Therefore, as shown in FIG. 4, the intermediate polarizing plate 26 can be simultaneously used as the lower-side polarizing plate 102 for the display panel 20 and the upper-side polarizing pate 201 for the parallax barrier panel 30.

Thus, the use of the intermediate polarizing plate 26 doubling as the lower-side polarizing plate 102 and the upper-side polarizing plate 201 allows for the simplification of the apparatus configuration without affecting the display quality while the utilization efficiency of light is maximized.

The FFS mode is employed as the liquid crystal mode of the display panel 20 in the first preferred embodiment. Similarly, in a case where in the in-plane switching mode is employed in place of the FFS mode, the color shift phenomenon occurring in the oblique visual field can be effectively suppressed by setting the relations among the optical axes and the rotation direction of the liquid crystal molecules as shown in FIG. 3.

Note that, as described above, the FFS mode herein refers to the liquid crystal mode in which the light transmittance is controlled by rotations of liquid crystal molecules in a plane that occur due to a transverse electric field generated by a planar electrode and a slit electrode laminated on one of the transparent substrates. Meanwhile, the in-plane switching mode herein refers to the liquid crystal mode in which the light transmittance is controlled by rotations of liquid crystal molecules in a plane that occur due to a transverse electric field generated by a comb-teeth electrode formed on one of the substrates.

As described above, the liquid crystal display 10 according to the first preferred embodiment has the following characteristics. The display panel 20 (first liquid crystal panel) has the first viewing-angle characteristic for the yellow shift direction DY1 (first yellow-shift direction) that is the oblique visual-filed direction in which an image shifts to yellow in white display and for the blue shift direction DB1 that is the oblique visual-field direction in which an image shifts to blue in white display.

Meanwhile, the parallax barrier panel 30 (second liquid crystal panel) has the second viewing-angle characteristic for the yellow shift direction DY2 (second yellow-shift direction) that is the oblique visual-field direction in which an image shifts to yellow in white display and for the blue shift direction DB2 (second blue-shift direction) that is the oblique visual-field direction in which an image shifts to blue in white display.

The liquid crystal display 10 according to the first preferred embodiment is characterized in that the display panel 20 and the parallax barrier panel 30 are laminated such that the yellow shift direction DY1 and the blue shift direction DB2 agree with each other and the blue shift direction DB1 and the yellow shift direction DY2 agree with each other.

Owing to the above-mentioned characteristics of the liquid crystal display 10 according to the first preferred embodiment, in a case where the display is viewed at an angle oblique to the display surface, the color shift in white display can be effectively suppressed. Thus, a high-display-quality image can be displayed on the liquid crystal display 10 that is an auto-stereoscopic image display employing the liquid-crystal parallax-barrier system.

In the display panel 20, the rubbing directions D22 and D25 (first upper and lower rubbing directions) in the transparent substrates 22 and 25 (first upper and lower substrates) and the rotation direction of the liquid crystal molecules in the liquid crystal layer 23 (first liquid crystal layer) during driving are set such that the first viewing-angle characteristic mentioned above is provided.

Meanwhile, in the parallax barrier panel 30, the rubbing directions D32 and D35 (second upper and lower rubbing directions) in the transparent substrates 32 and 35 (second upper and lower substrates) are set such that the second viewing-angle characteristic mentioned above is provided.

Therefore, a high-display-quality image can be displayed on the liquid crystal display 10 that has the laminated structure formed of the display panel 20 employing the FFS mode (or the in-plane switching mode) as the liquid crystal mode and of the parallax bather panel 30 employing the TN mode as the liquid crystal mode.

Second Preferred Embodiment

Figure 5:
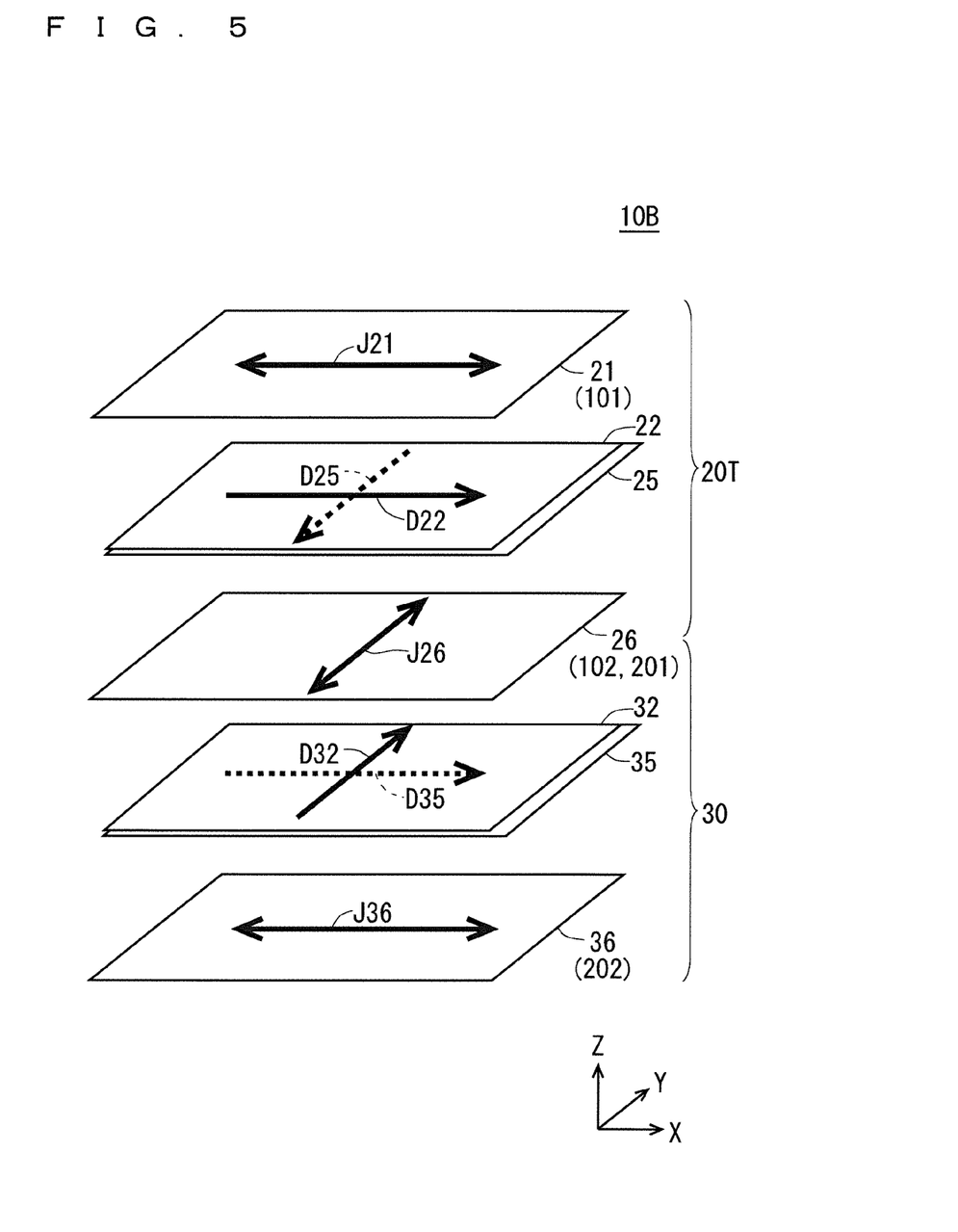
FIG. 5 is a view schematically describing a laminated structure and relations among optical axes in a liquid crystal display according to a second preferred embodiment.

FIG. 5 is a view schematically describing a laminated structure and relations among optical axes in a liquid crystal display 10B according to a second preferred embodiment. In the second preferred embodiment, the TN mode is employed not only in the parallax barrier panel 30 but also in a display panel 20T. The overall cross-sectional structure is the same as that of the liquid crystal display 10 according to the first preferred embodiment as shown in FIGS. 1 to 4 except for the display panel 20T that replaces the display panel 20. The following description will be given focusing on the parts of the display panel 20T that are different from those of the first preferred embodiment. The parts that are common to the first preferred embodiment are given the same reference signs, and a description thereof will be omitted.

For example, an alignment film (now shown) is disposed on the opposed surface (lower surface) of the transparent substrate 22 on the liquid-crystal-layer-23 side so as to be in contact with the liquid crystal layer 23, and then, the alignment film is rubbed in the +X direction. This allows, as shown in FIG. 5, the rubbing direction D22 in the liquid crystal layer 23 on the transparent-substrate-22 side to be set in the +X direction.

Meanwhile, another alignment film (not shown) is disposed on the opposed surface (upper surface) of the transparent substrate 25 on the liquid-crystal-layer-23 side so as to be in contact with the liquid crystal layer 23, and then, the alignment film is rubbed in the −Y direction. This allows, as shown in FIG. 5, the rubbing direction D25 in the liquid crystal layer 23 on the transparent-substrate-25 side to be set in the −Y direction.

Similarly to the display panel 20 according to the first preferred embodiment, the display panel 20T in the TN mode, with the absorption axes J21 and J26 in the upper-side polarizing plate 21 and the intermediate polarizing plate 26 and the alignment orientations of liquid crystals including the rubbing directions D22 and D25 as shown in FIG. 5, has the viewing angle characteristic (first viewing-angle characteristic) where the oblique visual-field direction in which an image shifts to yellow in white display becomes the yellow shift direction DY1 (including the upper left and lower right directions) and the oblique visual-field direction in which an image shifts to blue in white display becomes the blue shift direction DB1 (including the upper right and lower left directions).

Therefore, as for the liquid crystal display according to the second preferred embodiment similarly to the first preferred embodiment, in each of the oblique visual-field directions including the upper right and lower left directions and the upper left and lower right directions, "yellow color" and "blue color" overlap each other to be canceled out, whereby "white color" is displayed. Thus, the viewing angle characteristics of generating the color shift in the oblique visual fields can be effectively suppressed in the liquid crystal display 10B overall.

In the display panel 20T, the rubbing directions D22 and 25 (first upper and lower rubbing directions) in the transparent substrates 22 and 25 (first upper and lower substrates) are set such that the first viewing-angle characteristic mentioned above is provided.

Meanwhile, in the parallax barrier panel 30, the rubbing directions D32 and D35 in the transparent substrates 32 and 35 are set such that the second viewing-angle characteristic mentioned above is provided.

Therefore, a high-display-quality image can be displayed on the liquid crystal display 10B that has the laminated structure formed of the display panel 20T employing the TN mode as the liquid crystal mode and of the parallax bather panel 30 employing the TN mode as the liquid crystal mode.

Others

Although the auto-stereoscopic image display in which the parallax barrier panel allows different images to be visualized through each of the right and left eyes has been described as the liquid crystal display including two liquid crystal panels in the above preferred embodiments, the configuration is not limited thereto.

One example of the structure similar to the auto-stereoscopic image display is a dual-screen display that displays different images depending on whether the liquid crystal panel is viewed from the right or from the left. Moreover, the liquid crystal display can also be applicable to the functional displays suitable for various uses in which one of the laminated crystal panels has, as the filter function, the shutter function of switching between display and non-display, the viewing-angle control function (of switching between a wide viewing-angle mode and a narrow viewing-angle mode), or the function of superimposing, for example, character information and figure patterns such as a box that are independent of the image displayed on the other panel.

In the present invention, the above preferred embodiments can be arbitrarily combined, or each preferred embodiment can be appropriately varied or omitted within the scope of the invention.

As the liquid crystal mode, for example, the FFS mode or the in-plane switching mode may be employed by both of the display panel 20 and the parallax bather panel 30. Thus, any given liquid crystal mode may be set for each of the display panel 20 and the parallax barrier panel 30.

The liquid crystal displays employing the transverse electric field modes such as the FFS mode and the in-plane switching mode have increased viewing angle and improved display performance compared to those of the TN mode. Meanwhile, the liquid crystal displays employing the TN mode has the characteristics of increased transmittance and enhanced brightness in displaying compared to those of the FFS mode and the in-plane switching mode. Therefore, the liquid crystal modes are desirably selected, in consideration of the above-described characteristics, as appropriate according to, for example, the intended use.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display comprising a laminated structure of a first liquid crystal panel and a second liquid crystal panel, an upper part or a lower part of said laminated structure being defined as a display surface, wherein
said first liquid crystal panel includes a first liquid crystal layer, a first upper substrate and a first lower substrate sandwiching said first liquid crystal layer, a first upper polarizing plate located over said first upper substrate, and a first lower polarizing plate located under said first lower substrate,
said second liquid crystal panel includes a second liquid crystal layer, a second upper substrate and a second lower substrate sandwiching said second liquid crystal layer, a second upper polarizing plate located over said second upper substrate, and a second lower polarizing plate located under said second lower substrate,
said first liquid crystal panel has a first viewing-angle characteristic for a first yellow-shift direction and a first blue-shift direction, said first yellow-shift direction being a visual field direction in which an image shifts to yellow in white display, said first blue-shift direction being a visual field direction in which an image shifts to blue in white display,
said second liquid crystal panel has a second viewing-angle characteristic for a second yellow-shift direction and a second blue-shift direction, said second yellow-shift direction being a visual field direction in which an image shifts to yellow in white display, said second blue-shift direction being a visual field direction in which an image shifts to blue in white display, and
said first and second liquid crystal panels are laminated such that said first yellow-shift direction and said second blue-shift direction agree with each other and that said first blue-shift direction and said second yellow-shift direction agree with each other.

2. The liquid crystal display according to claim 1, wherein
said first liquid crystal panel is formed over said second liquid crystal panel with an intermediate polarizing plate therebetween,
an absorption axis of said second upper polarizing plate and an absorption axis of said first lower polarizing plate are set in an identical direction, and
said intermediate polarizing plate doubles as said second upper polarizing plate and said first lower polarizing plate.

3. The liquid crystal display according to claim 1, wherein
said first liquid crystal panel is a display panel that displays an image using a matrix of a plurality of pixels, an upper surface of said first liquid crystal panel serving as said display surface,
said second liquid crystal panel is located under said display panel, said second liquid crystal panel being a parallax barrier panel that switches between a complete light-transmissive state that is set for a first-form image and a partial light-shielding state that is set for a second-form image and alternately forms a transmissive region and a shielding region in a horizontal direction, and
said plurality of pixels in said display panel include a plurality of first-type pixels and a plurality of second-type pixels alternately located in said horizontal direction, said plurality of first-type pixels and said plurality of second-type pixels serving for displaying said second-form image.

4. The liquid crystal display according to claim 1, wherein
said first liquid crystal panel is configured to drive said first liquid crystal layer in a fringe field switching (FFS) mode or an in-plane switching mode,
said second liquid crystal panel is configured to drive said second liquid crystal layer in a twisted nematic (TN) mode,
in said first liquid crystal panel, a first upper rubbing direction and a first lower rubbing direction in said first upper and lower substrates and a rotation direction of liquid crystal molecules in said first liquid crystal layer during driving are set such that said first viewing-angle characteristic is provided, and
in said second liquid crystal panel, a second upper rubbing direction and a second lower rubbing direction of said second upper and lower substrates are set such that said second viewing-angle characteristic is provided.

5. The liquid crystal display according to claim 1, wherein
said first and said second liquid crystal panels are configured to drive said first and second liquid crystal layers in a twisted nematic (TN) mode,
in said first liquid crystal panel, a first upper rubbing direction and a first lower rubbing direction of said first upper and lower substrates are set such that said first viewing-angle characteristic is provided, and in said second liquid crystal panel, a second upper rubbing direction and a second lower rubbing direction of said second upper and lower substrates are set such that said second viewing-angle characteristic is provided.

* * * * *